US008344641B1

(12) United States Patent
Isaacson et al.

(10) Patent No.: US 8,344,641 B1
(45) Date of Patent: Jan. 1, 2013

(54) LED ILLUMINATION CONTROL USING SIMPLE DIGITAL COMMAND STRUCTURE

(75) Inventors: Chris Isaacson, Encinitas, CA (US); Peter Verkaik, Heemstede (NL)

(73) Assignee: NuLEDs, Inc., Vista, CA (US)

( * ) Notice: Subject to any disclaimer, the term of this patent is extended or adjusted under 35 U.S.C. 154(b) by 248 days.

(21) Appl. No.: 12/872,890

(22) Filed: Aug. 31, 2010

Related U.S. Application Data

(60) Provisional application No. 61/238,977, filed on Sep. 1, 2009.

(51) Int. Cl.
*H05B 41/16* (2006.01)
(52) U.S. Cl. .................................. 315/250; 315/292
(58) Field of Classification Search .............. 315/250, 315/291, 292
See application file for complete search history.

(56) References Cited

U.S. PATENT DOCUMENTS

| 6,865,428 B2 | 3/2005 | Gonzales et al. | |
|---|---|---|---|
| 7,415,310 B2 | 8/2008 | Bovee et al. | |
| 7,417,556 B2 | 8/2008 | Ling | |
| 7,427,840 B2 | 9/2008 | Morgan et al. | |
| 8,207,686 B2 * | 6/2012 | Sloan | 315/307 |
| 2002/0145394 A1 * | 10/2002 | Morgan et al. | 315/291 |
| 2004/0158333 A1 | 8/2004 | Ha et al. | |
| 2008/0164826 A1 * | 7/2008 | Lys | 315/250 |
| 2008/0164827 A1 * | 7/2008 | Lys | 315/250 |

OTHER PUBLICATIONS

"Dali", 2001, pp. 1-62, Dali AG (Digital Addressable Lighting Interface Activity Group), Germany.

* cited by examiner

*Primary Examiner* — Thuy Vinh Tran
(74) *Attorney, Agent, or Firm* — Robroy R. Fawcett

(57) ABSTRACT

Disclosed is an illumination controller for use with at least one three-color LED module. The illumination controller includes a command input, three color control outputs, and a processor. The command input receives a unitary illumination control command having first, second and third color level values, and a fade rate value. First, second, and third color control outputs pulse modulates respective first, second and third signals that powers an illumination level for each color. The processor, responsive to a control command, transitions the first color control output in accordance with the received command's first color level value and the fade rate value, transitions the second color control output in accordance with the received command's second color level value and the fade rate value, and transitions the third color control output in accordance with the received command's third color level value and the fade rate value. The three colors may be red, green, and blue.

23 Claims, 3 Drawing Sheets

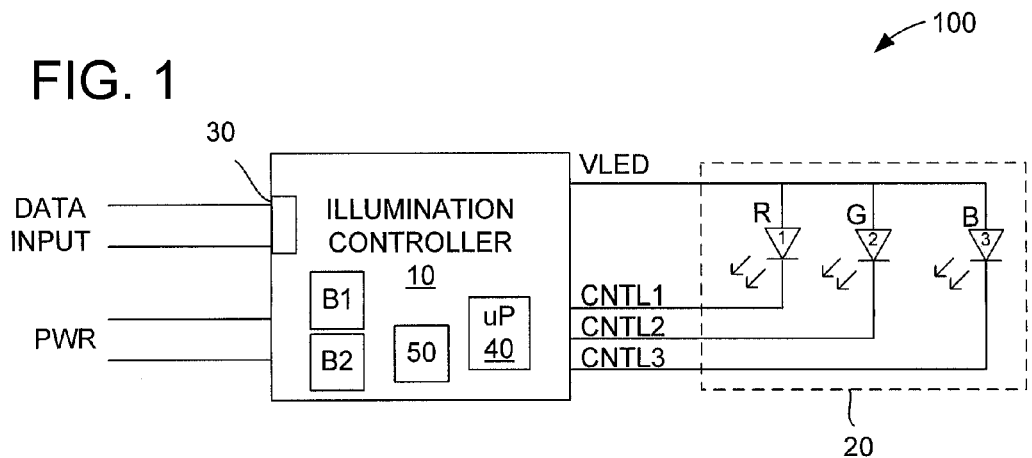

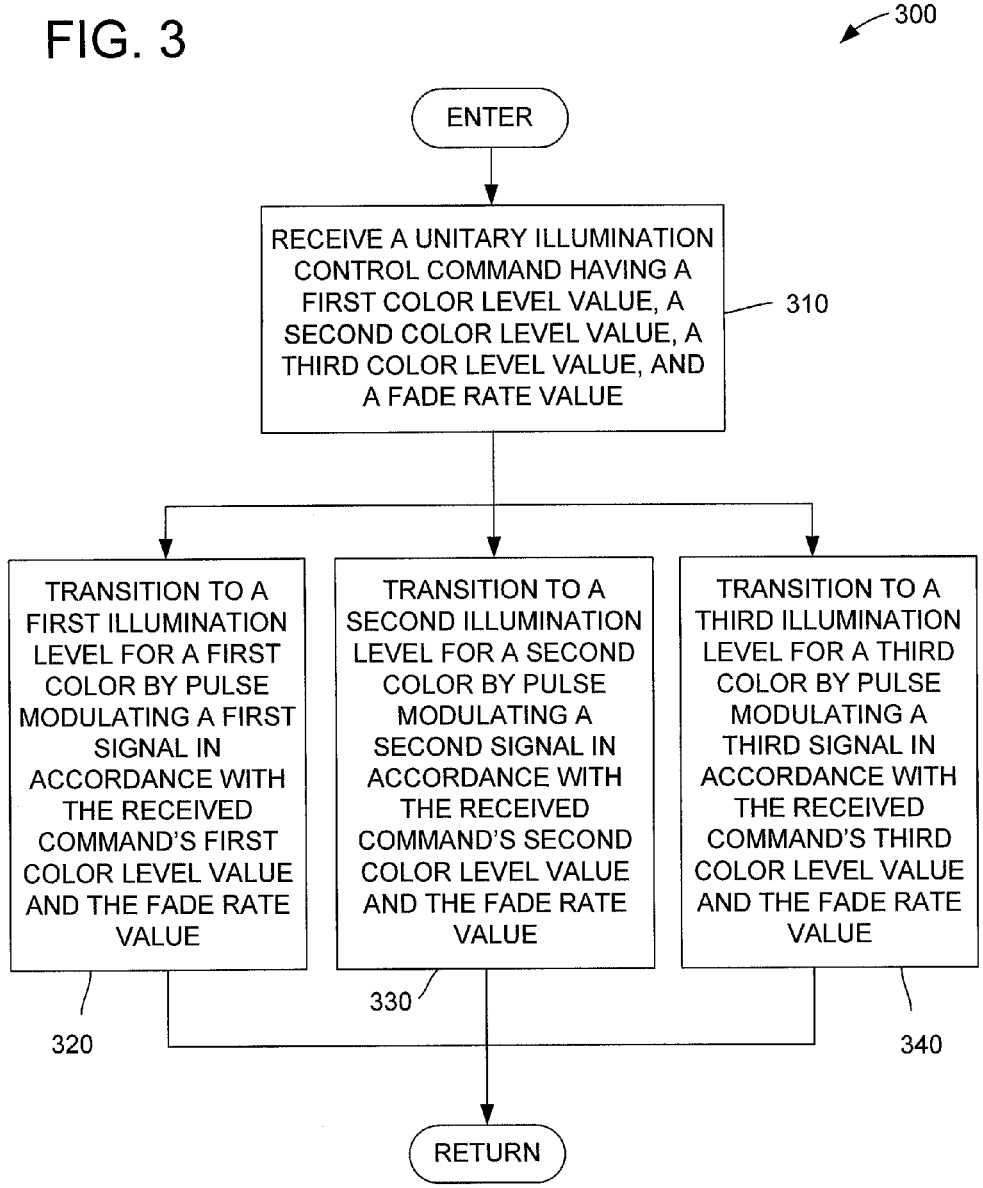

| | 410 | 420 | 430 | 440 | 450 | 460 | 470 |
|---|---|---|---|---|---|---|---|
| | SEQ # | Red Level | Green Level | Blue Level | Fade Time | Hold Time | Color Description |
| | 1 | 255 | 255 | 255 | 1 | 2 | Ice Cool White |
| | 2 | 255 | 255 | 150 | 1 | 2 | White |
| | 3 | 255 | 255 | 110 | 1 | 2 | Warm White |
| | 4 | 255 | 255 | 70 | 1 | 2 | Ultra Warm White |
| | 5 | 255 | 255 | 0 | 3 | 3 | Yellow |
| | 6 | 127 | 255 | 0 | 3 | 3 | Yellowish Green |
| | 7 | 0 | 255 | 0 | 3 | 3 | Green |
| | 8 | 0 | 255 | 127 | 3 | 3 | Bluish Green |
| | 9 | 0 | 255 | 255 | 3 | 3 | Cyan |
| | 10 | 0 | 127 | 255 | 3 | 3 | Greenish Blue |
| | 11 | 0 | 0 | 255 | 3 | 3 | Blue |
| | 12 | 127 | 0 | 255 | 3 | 3 | Purple |
| | 13 | 255 | 0 | 255 | 3 | 3 | Fuscia |
| | 14 | 255 | 0 | 127 | 3 | 3 | Hot Pink |
| | 15 | 255 | 0 | 0 | 3 | 3 | Red |
| | 16 | 255 | 127 | 0 | 3 | 3 | Orange |

LED ILLUMINATION CONTROL USING SIMPLE DIGITAL COMMAND STRUCTURE

CROSS-REFERENCE TO RELATED APPLICATIONS

This application claims the benefit of U.S. Provisional Application No. 61/238,977, filed Sep. 1, 2009, which application is incorporated herein by reference.

BACKGROUND OF THE INVENTION

1. Field of the Invention

The present invention relates to light-emitting diode (LED) illumination control using a simple digital command structure.

2. Description of the Prior Art and Related Information

LED illumination control is often accomplished by the modification of existing illumination control systems largely developed for AC incandescent lamps or similar devices. Such systems have relatively complicated command structures and modalities.

An example of an existing digital interface for illumination control system is DALI which is an acronym for Digital Addressable Lighting Interface. DALI typically uses a two-byte command having an address byte and a control byte. The data rate is typically 1200 bits per second. The control byte can have one of 512 different values, each representing distinct operations. Such digital interface may require several commands to accomplish relatively simple LED illumination control.

There is, therefore, a need for relatively simple technique for LED illumination control. The present invention provides the methods and apparatuses to meet these needs.

SUMMARY OF THE INVENTION

The present invention may be embodied in an illumination controller for use with at least one three-color LED module. The illumination controller includes a command input, three color control outputs, and a processor. The command input receives a unitary illumination control command having a first color level value, a second color level value, a third color level value, and a fade rate value. The first color control output pulse modulates a first signal that powers a first illumination level for a first color, the second color control output pulse modulates a second signal that powers a second illumination level for a second color, and the third color control output pulse modulates a third signal that powers a third illumination level for a third color. The processor, responsive to a unitary illumination control command received on the command input, transitions the first color control output in accordance with the received command's first color level value and the fade rate value, transitions the second color control output in accordance with the received command's second color level value and the fade rate value, and transitions the third color control output in accordance with the received command's third color level value and the fade rate value. The three colors may be red, green, and blue.

In more detailed features of the invention, the illumination controller may further include first and second front panel buttons. The processor may be configured with a pre-programmed illumination sequence that is controlled using the first and second front panel buttons. The first, second and third signals are below 24 volts. The unitary illumination control command may be an ASCII string that may be executed when the processor receives a carriage return character. The fade rate value may correspond to a fade rate greater than zero.

In other more detailed features of the invention, the command input may be a serial interface such as an RS-232 interface, or an RS-485 interface. Further, the command input may be a wireless interface.

The present invention also may be embodied in a method for controlling at least one three-color LED module. In the method, a unitary illumination control command is received. The unitary illumination control command has a first color level value, a second color level value, a third color level value, and a fade rate value. The illumination of the LED module is transitioned to a first illumination level for a first color by pulse modulating a first signal in accordance with the received command's first color level value and the fade rate value, is transitioned to a second illumination level for a second color by pulse modulating a second signal in accordance with the received command's second color level value and the fade rate value, and is transition to a third illumination level for a third color by pulse modulating a third signal in accordance with the received command's third color level value and the fade rate value.

The present invention also may be embodied in an apparatus for controlling at least one three-color LED module. The apparatus includes means for receiving a unitary illumination control command having a first color level value, a second color level value, a third color level value, and a fade rate value; means for transitioning to a first illumination level for a first color by pulse modulating a first signal in accordance with the received command's first color level value and the fade rate value; means for transitioning to a second illumination level for a second color by pulse modulating a second signal in accordance with the received command's second color level value and the fade rate value; and means for transitioning to a third illumination level for a third color by pulse modulating a third signal in accordance with the received command's third color level value and the fade rate value.

Further, the present invention may be embodied in a computer program product comprising computer readable medium storing: code for causing a computer to receive a unitary illumination control command having a first color level value, a second color level value, a third color level value, and a fade rate value; code for causing a computer to transition to a first illumination level for a first color by pulse modulating a first signal in accordance with the received command's first color level value and the fade rate value; code for causing a computer to transition to a second illumination level for a second color by pulse modulating a second signal in accordance with the received command's second color level value and the fade rate value; and code for causing a computer to transition to a third illumination level for a third color by pulse modulating a third signal in accordance with the received command's third color level value and the fade rate value.

BRIEF DESCRIPTION OF THE DRAWINGS

The accompanying drawings illustrate embodiments of the present invention and, together with the description, serve to explain the principles of the invention.

FIG. 1 is a schematic block diagram illustrating an illumination controller, according to the present invention.

FIG. 2 is a schematic diagram illustrating a unitary illumination control command, according to the present invention.

FIG. 3 is a flow diagram illustrating a method for three-color LED illumination control, according to the present invention.

FIG. 4 is a table of a pre-programmed illumination sequence, according to the present invention.

DETAILED DESCRIPTION

With reference to FIGS. 1-3, the present invention may be embodied in an illumination controller 10 (FIG. 1) for use with at least one three-color LED module 20. The illumination controller includes a command input, three color control outputs, CNTL1, CNTL2, and CNTL3, and a processor 40. The command input 30 receives a unitary illumination control command 200 (FIG. 2) having a first color level value, a second color level value, a third color level value, and a fade rate value. The first color control output CNTL1 pulse modulates a first signal that powers a first illumination level for a first color, the second color control output CNTL2 pulse modulates a second signal that powers a second illumination level for a second color, and the third color control output CNTL3 pulse modulates a third signal that powers a third illumination level for a third color. The processor 40, responsive to a unitary illumination control command 200 received on the command input 30, transitions the first color control output in accordance with the received command's first color level value and the fade rate value, transitions the second color control output in accordance with the received command's second color level value and the fade rate value, and transitions the third color control output in accordance with the received command's third color level value and the fade rate value. The three colors may be red, green, and blue.

The first, second and third signals may be below 24 volts. The unitary illumination control command 200 may be an ASCII string that may be executed when the processor 40 receives a carriage return character. The fade rate value may correspond to a fade rate greater than zero. The controller 10 may hold the outputs at the color levels defined by the command after the fade time.

The command input 30 may be a serial interface such as an RS-232 interface, or an RS-485 interface. Further, the command input may be a wireless interface.

The illumination controller 10 may further include first and second front panel buttons, B1 and B2. The processor may be configured with a pre-programmed illumination sequence 410 that is controlled using the first and second front panel buttons.

The present invention also may be embodied in a method 300 for controlling at least one three-color LED module 20. In the method, a unitary illumination control command 200 is received (step 310). The unitary illumination control command has a first color level value, a second color level value, a third color level value, and a fade rate value (step 320). The illumination of the LED module is transitioned to a first illumination level for a first color by pulse modulating a first signal in accordance with the received command's first color level value and the fade rate value (step 330), is transitioned to a second illumination level for a second color by pulse modulating a second signal in accordance with the received command's second color level value and the fade rate value, and transitioned to a third illumination level for a third color by pulse modulating a third signal in accordance with the received command's third color level value and the fade rate value (step 340).

The present invention also may be embodied in an apparatus 10 for controlling at least one three-color LED module. The apparatus includes means 30 for receiving a unitary illumination control command 200 having a first color level value, a second color level value, a third color level value, and a fade rate value; means 40 for transitioning to a first illumination level for a first color by pulse modulating a first signal in accordance with the received command's first color level value and the fade rate value; means 40 for transitioning to a second illumination level for a second color by pulse modulating a second signal in accordance with the received command's second color level value and the fade rate value; and means 40 for transitioning to a third illumination level for a third color by pulse modulating a third signal in accordance with the received command's third color level value and the fade rate value.

Further, the present invention may be embodied in a computer program product comprising computer readable medium 50 storing: code for causing a computer to receive a unitary illumination control command 200 having a first color level value, a second color level value, a third color level value, and a fade rate value; code for causing a computer to transition to a first illumination level for a first color by pulse modulating a first signal in accordance with the received command's first color level value and the fade rate value; code for causing a computer to transition to a second illumination level for a second color by pulse modulating a second signal in accordance with the received command's second color level value and the fade rate value; and code for causing a computer to transition to a third illumination level for a third color by pulse modulating a third signal in accordance with the received command's third color level value and the fade rate value.

The illumination controller 10 may provide RGB LED color control for a single lighting zone in smaller to mid-sized architectural spaces. The controller and the LED module(s) 20 may form one addressable segment 100 of a plurality of individually addressable and controllable segments corresponding to respective lighting zones. The controller may control common anode RGB components with input voltages below 24 volts (or it can alternatively control 3 separate single color LED strings simultaneously). The illumination controller utilizes pulse frequency modulation (PFM) to create smooth color fades and a logarithmic algorithm for more accurate color matching of eight-bit (256 level) RGB values. The unitary illumination control command 200 may include an address for the illumination controller.

The illumination controller may be wall mounted and may be installed in a standard single-gang electrical box (advantageously separate from any AC line voltage wiring) and may be manually operated with only two front panel buttons. A power supply is separate and should be specifically matched to the LED system being driven.

The illumination controller 10 may include a 6-position screw terminal connector. Typical screw positions may be labeled Vin, GND, Vout, R, G, B. Multiple parallel LED components may be wired in the same terminal block as long as the voltage requirements are compatible. Vin and GND are for the DC input from the power supply. (typically 6 volt minimum to 24 volt maximum) matched to the LED system. Vout may be for a common anode of the LED system. Further, R is for the Red channel, G is for the Green channel, and B is for the Blue channel.

The processor 40 may be a configurable communications controller, such as part number SX28AC/SS-G available from Parallax Inc. of Rocklin, Calif. The control outputs may each be implemented using a power MOSFET, such as part number FDP7030BL available from Fairchild Semiconductor of San Jose, Calif.

Manual operation of the illumination controller 10 may be accomplished using two buttons, B1 and B2, and a predefined sequence of colors that will be displayed in a continuous loop (Loop Mode) at variable speeds. The sequence can be frozen (Freeze Mode) at any point in the loop.

Button 1 (the top button) toggles between Loop Mode and Freeze Mode. Button 2 (the bottom button) has different functions depending on the Mode. Upon power-up, the illumination controller is in Loop Mode with the pre-defined fade and hold times.

In Loop Mode, Button 2 acts as a time multiplier. Every time Button 2 is pressed (and released) in Loop Mode, the fade times and hold times are doubled until the multiplier is 32 (2, 4, 8, 16, 32). Then the multiplier goes back to 1 on the next press and release. To get directly back to a multiplier of 1 from any given multiplier, press and hold Button 2 for two seconds, then release. At any time during Loop Mode, a press and release of Button 1 will freeze the display (even in the middle of a color fade) and hold on that color indefinitely until another press of a button. While in Freeze Mode, each press and release of Button 2 will skip to the next defined color and stay there indefinitely until another press of a button.

To exit Freeze Mode and return to Loop Mode, press and release Button 1. The loop will fade to the next color in the sequence and continue looping through the sequence with the time multiplier set before entering Freeze Mode. After multiple button presses, to determine which settings are current, a press and release of Button 2 will indicate whether or not the illumination controller is in Freeze Mode or Loop Mode (the colors will change with each press and release in Freeze Mode). If it is in Loop Mode, pressing and holding Button 2 for two seconds, then releasing, will to return to the default settings.

Fade time is the time it takes to reach the defined color from the previous color (1 to 60 seconds). Hold time is the time the color stays static before the fade to the next color (0.1 to 60 seconds). Set the fade and hold times to the shortest times you will possibly want and adjust later with the multiplier. Times may be defined to the nearest tenth of a second (e.g. 6.7 seconds).

The sequence 410 may be stored as a table in the processor 40, or in a computer readable medium 50. Each step of the sequence has a red level value 420, a green level value 430, a blue level value 440, a fade time value 450, and a hold time value 460. The RGB levels correspond to a color description 470.

The illumination controller may be extended to add control for a fourth color, such as amber, for a richer color selection. In such case, an amber level value would be added to the unitary illumination control command.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored as one or more instructions or code on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An illumination controller for use with at least one three-color LED module, comprising:
   a command input for receiving a unitary illumination control command, the unitary illumination control command having a first color level value, a second color level value, a third color level value, and a fade rate value;
   a first color control output for pulse modulating a first signal that powers a first illumination level for a first color;
   a second color control output for pulse modulating a second signal that powers a second illumination level for a second color;

a third color control output for pulse modulating a third signal that powers a third illumination level for a third color; and a processor that, responsive to the unitary illumination control command received on the command input, transitions the first color control output in accordance with the received command's first color level value and the fade rate value, transitions the second color control output in accordance with the received command's second color level value and the fade rate value; and transitions the third color control output in accordance with the received command's third color level value and the fade rate value.

2. An illumination controller as defined in claim 1, wherein the first color is red, the second color is green, and the third color is blue.

3. An illumination controller as defined in claim 1, further comprising first and second front panel buttons, and wherein the processor is configured with a pre-programmed illumination sequence that is controlled using the first and second front panel buttons.

4. An illumination controller as defined in claim 1, wherein first, second and third signals are below 24 volts.

5. An illumination controller as defined in claim 1, wherein the unitary illumination control command is an ASCII string.

6. An illumination controller as defined in claim 1, wherein the unitary illumination control command is executed when the processor receives a carriage return character.

7. An illumination controller as defined in claim 1, wherein the fade rate value corresponds to a fade rate greater than zero.

8. An illumination controller as defined in claim 1, wherein the command input is a serial interface.

9. An illumination controller as defined in claim 8, wherein the serial interface is an RS-232 interface.

10. An illumination controller as defined in claim 8, wherein the serial interface is an RS-485 interface.

11. An illumination controller as defined in claim 1, wherein the command input is a wireless interface.

12. An illumination controller as defined in claim 1, wherein the illumination controller uses pulse frequency modulation for modulating the first, second, and third signals.

13. A method for controlling at least one three-color LED module, comprising:

receiving a unitary illumination control command having a first color level value, a second color level value, a third color level value, and a fade rate value;

transitioning to a first illumination level for a first color by pulse modulating a first signal in accordance with the received command's first color level value and the fade rate value;

transitioning to a second illumination level for a second color by pulse modulating a second signal in accordance with the received command's second color level value and the fade rate value; and transitioning to a third illumination level for a third color by pulse modulating a third signal in accordance with the received command's third color level value and the fade rate value.

14. A method for controlling as defined in claim 13, wherein the first color is red, the second color is green, and third color is blue.

15. A method for controlling as defined in claim 13, wherein the unitary illumination control command is an ASCII string.

16. A method for controlling as defined in claim 13, wherein the fade rate value corresponds to a fade rate greater than zero.

17. A method for controlling as defined in claim 13, wherein pulse frequency modulation is used for modulating the first, second, and third signals.

18. Apparatus for controlling at least one three-color LED module, comprising:

means for receiving a unitary illumination control command having a first color level value, a second color level value, a third color level value, and a fade rate value;

means for transitioning to a first illumination level for a first color by pulse modulating a first signal in accordance with the received command's first color level value and the fade rate value, transitioning to a second illumination level for a second color by pulse modulating a second signal in accordance with the received command's second color level value and the fade rate value, transitioning to a third illumination level for a third color by pulse modulating a third signal in accordance with the received command's third color level value and the fade rate value.

19. A computer program product comprising:

a non-transitory computer readable medium storing:

code for causing a computer to receive a unitary illumination control command having a first color level value, a second color level value, a third color level value, and a fade rate value;

code for causing the computer to transition to a first illumination level for a first color by pulse modulating a first signal in accordance with the received command's first color level value and the fade rate value;

code for causing the computer to transition to a second illumination level for a second color by pulse modulating a second signal in accordance with the received command's second color level value and the fade rate value; and code for causing the computer to transition to a third illumination level for a third color by pulse modulating a third signal in accordance with the received command's third color level value and the fade rate value.

20. A method for controlling at least one four-color LED module, comprising:

receiving a unitary illumination control command having a first color level value, a second color level value, a third color level value, a fourth color level value, and a fade rate value;

transitioning to a first illumination level for a first color by pulse modulating a first signal in accordance with the received command's first color level value and the fade rate value;

transitioning to a second illumination level for a second color by pulse modulating a second signal in accordance with the received command's second color level value and the fade rate value;

transitioning to a third illumination level for a third color by pulse modulating a third signal in accordance with the received command's third color level value and the fade rate value; and transitioning to a fourth illumination level for a fourth color by pulse modulating a fourth signal in accordance with the received command's fourth color level value and the fade rate value.

21. An illumination controller as defined in claim 20, wherein the first color is red, the second color is green, the third color is blue, and the fourth color is amber.

22. An illumination controller for use with at least one four-color LED module, comprising:

a command input for receiving a unitary illumination control command, the unitary illumination control command having a first color level value, a second color level value, a third color level value, a fourth color level value, and a fade rate value;

a first color control output for pulse modulating a first signal that powers a first illumination level for a first color;

a second color control output for pulse modulating a second signal that powers a second illumination level for a second color;

a third color control output for pulse modulating a third signal that powers a third illumination level for a third color;

a fourth color control output for pulse modulating a fourth signal that powers a fourth illumination level for a fourth color; and a processor that, responsive to the unitary illumination control command received on the command input, transitions the first color control output in accordance with the received command's first color level value and the fade rate value, transitions the second color control output in accordance with the received command's second color level value and the fade rate value; transitions the third color control output in accordance with the received command's third color level value and the fade rate value; and transitions the fourth color control output in accordance with the received command's fourth color level value and the fade rate value.

23. A method for controlling at least three LED modules, comprising:

receiving a unitary illumination control command having a first illumination level value, a second illumination level value, a third illumination level value, and a fade rate value;

transitioning to a first illumination level for a first LED module by pulse modulating a first signal in accordance with the received command's first illumination level value and the fade rate value;

transitioning to a second illumination level for a second LED module by pulse modulating a second signal in accordance with the received command's second illumination level value and the fade rate value; and transitioning to a third illumination level for a third LED module by pulse modulating a third signal in accordance with the received command's third illumination level value and the fade rate value.

* * * * *